UNITED STATES PATENT OFFICE.

CHARLES EMILE SOHN, OF LONDON, ENGLAND, ASSIGNOR OF ONE-HALF TO USHER-WALKER, LIMITED, OF LONDON, ENGLAND.

RESILIENT COMPOSITION FOR PRINTERS' ROLLERS.

1,215,886.　　　　　Specification of Letters Patent.　　Patented Feb. 13, 1917.

No Drawing.　　Application filed December 23, 1914.　Serial No. 878,800.

*To all whom it may concern:*

Be it known that I, CHARLES EMILE SOHN, a subject of the King of England, residing at London, in England, have invented certain new and useful Improvements in Resilient Compositions for Printers' Rollers, of which the following is a specification.

This invention is for improvements in resilient compositions for printers' rollers.

It is well-known to make printers' rollers from gelatinous compositions, such as mixtures of soaked glue and glycerin, but if in use these compositions are subjected to a high temperature they are apt to become distorted or partly fused and sometimes they burst. It has also been proposed to render such compositions insoluble by the action of formaldehyde and other chemical agents, but hitherto such treatments have been subject to serious disadvantages; treatment with formaldehyde for example causing the gelatinous mixture to set very rapidly and greatly diminishing the strength of the resulting material.

It is known to prepare elastic compositions by treating colloids such as Japan glue dissolved in glycerin so as to form a semifluid mass, with salicylic acid, tannin, lysoform and a small percentage of hexamethylene-tetramin. Compositions prepared in such manner are very soft and possess a permanent elasticity and on account of these properties they have been employed as filling materials for hollow tires.

The object of the present invention is the preparation from gelatinous compositions of a material for printers' rollers, the composition being treated in such a way as to impart thereto the property of infusibility while giving the material ample time to set so that the operation of molding can be conveniently carried out, the treatment being such as not to weaken the resulting composition in any way.

According to this invention a process of producing an infusible resilient composition for printers' rollers consists in mixing and melting up together soaked glue and glycerin, introducing a concentrated aqueous solution of hexamethylene-tetramin in about the proportion of between .2% and 1% upon the glue-glycerin mixture, and running the mixture into molds of the desired shape which are kept hot for sometime.

The following is a description of one method of carrying this invention into effect.

Glue is soaked in water until it has absorbed the desired amount when it is then allowed to stand until flexible according to the usual practice. The soaked glue is mixed with glycerin in the usual proportions and these are melted up together, say in a steam heated copper. There is then introduced into the mixture a concentrated aqueous solution of hexamethylene-tetramin. The proportion of hexamethylene-tetramin may conveniently be between .2% and 1% of the composition. Thus for example 1 lb. of hexamethylene-tetramin may be dissolved in water and added to 400 lbs. of the glue-glycerin mixture.

The whole is mechanically stirred and run out as quickly as possible into molds of the desired shape. The molds are kept hot for some time—say two hours, the length of time depending upon the proportions of the ingredients used, the alkalinity or acidity and other circumstances.

A simple preliminary test is sufficient to decide which proportions are most advantageous and also the temperature and duration of the operations.

The advantages of this process are that ample time is afforded for the manipulation of the composition before it sets. The resulting material has the property of infusibility and yet the strength of the composition is not in any way diminished.

What I claim as my invention and desire to secure by Letters Patent is:—

1. The herein described process for the production of an infusible resilient composition for printers' rollers, which consists in soaking glue in water until the desired amount has been absorbed, allowing the soaked glue to stand until it is flexible, mixing the soaked glue with glycerin and melting up the mixture, introducing into the mixture a concentrated aqueous solution of hexamethylene-tetramin in about the proportion of between two-tenths per cent. and one per cent. of the glue-glycerin mixture, stirring the mixture thus produced, running it quickly into molds of the desired shape, and keeping the said molds hot for some time after the mixture has been run into them.

2. The herein described infusible resilient composition of matter for printers' rollers, consisting of soaked glue and glycerin and hexamethylene-tetramin, the quantity of hexamethylene-tetramin being between two-tenths per cent. and one per cent. of the glue-glycerin mixture.

In testimony whereof I have signed my name to this specification in the presence of two subscribing witnesses.

CHARLES EMILE SOHN.

Witnesses:
HARRY D. ZEID,
ALFRED JAMES COWING.